United States Patent
Balogh et al.

(10) Patent No.: US 9,837,659 B2
(45) Date of Patent: Dec. 5, 2017

(54) PROCESS FOR LITHIATING NEGATIVE ELECTRODES FOR LITHIUM ION ELECTROCHEMICAL CELLS

(71) Applicant: GM Global Technology Operations LLC, Detroit, MI (US)

(72) Inventors: Michael P. Balogh, Novi, MI (US); Nicholas P. Irish, Commerce, MI (US); Nicole D. Ellison, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 88 days.

(21) Appl. No.: 14/935,661

(22) Filed: Nov. 9, 2015

(65) Prior Publication Data
US 2016/0181594 A1   Jun. 23, 2016

Related U.S. Application Data

(60) Provisional application No. 62/095,184, filed on Dec. 22, 2014.

(51) Int. Cl.
| | |
|---|---|
| B29C 65/02 | (2006.01) |
| B32B 37/06 | (2006.01) |
| B32B 37/14 | (2006.01) |
| B32B 38/10 | (2006.01) |
| B32B 43/00 | (2006.01) |
| H01M 4/1393 | (2010.01) |
| H01M 4/04 | (2006.01) |
| H01M 4/139 | (2010.01) |

(Continued)

(52) U.S. Cl.
CPC ......... *H01M 4/1393* (2013.01); *H01M 4/043* (2013.01); *H01M 4/0471* (2013.01); *H01M 4/139* (2013.01); *H01M 10/4235* (2013.01); *H01M 4/131* (2013.01); *H01M 4/133* (2013.01); *H01M 4/134* (2013.01); *H01M 4/1391* (2013.01); *H01M 4/1395* (2013.01); *H01M 4/386* (2013.01); *H01M 4/387* (2013.01); *H01M 4/485* (2013.01); *H01M 10/052* (2013.01)

(58) Field of Classification Search
USPC ....... 156/230, 231, 233, 234, 235, 238, 247, 156/249
See application file for complete search history.

(56) References Cited

U.S. PATENT DOCUMENTS 6,761,744 B1 * 7/2004 Tsukamoto ......... H01M 4/0435
29/623.3
8,663,840 B2   3/2014 Nazri et al.
(Continued)

*Primary Examiner* — Sing P Chan
(74) *Attorney, Agent, or Firm* — Harness, Dickey & Pierce, P.L.C.

(57) ABSTRACT

Methods for pre-lithiating negative electrodes for lithium-ion electrochemical cells (e.g., batteries) are provided. The methods include disposing a lithium metal source comprising a layer of lithium metal adjacent to a surface of a pre-fabricated negative electrode. The lithium metal source and electrode are heated (e.g., to a temperature of ≥about 100° C.) to transfer a quantity of lithium to the pre-fabricated negative electrode. This lithiation process adds excess active lithium capacity that enables replacement of irreversibly lost lithium during cell formation and cell aging, thus leading to increased battery capacity and improved battery life. The methods may be batch or continuous.

14 Claims, 4 Drawing Sheets

(51) Int. Cl.
  *H01M 10/42* (2006.01)
  *H01M 4/133* (2010.01)
  *H01M 4/131* (2010.01)
  *H01M 4/134* (2010.01)
  *H01M 4/1391* (2010.01)
  *H01M 4/1395* (2010.01)
  *H01M 4/38* (2006.01)
  *H01M 4/485* (2010.01)
  *H01M 10/052* (2010.01)

(56) References Cited

U.S. PATENT DOCUMENTS

| | | |
|---|---|---|
| 8,841,014 B1 | 9/2014 | Deshpande et al. |
| 8,974,946 B2 | 3/2015 | Cai et al. |
| 8,999,584 B2 | 4/2015 | Jiang et al. |
| 9,028,565 B2 | 5/2015 | Huang |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,350,046 B2 | 5/2016 | Huang |
| 9,362,551 B2 | 6/2016 | Sachdev et al. |
| 9,362,552 B2 | 6/2016 | Sohn et al. |
| 9,455,430 B2 | 9/2016 | Huang et al. |
| 2007/0204457 A1* | 9/2007 | Sato ............ H01M 4/13 29/623.1 |
| 2012/0229096 A1 | 9/2012 | Nazri |
| 2012/0231321 A1 | 9/2012 | Huang et al. |
| 2013/0284338 A1 | 10/2013 | Xiao et al. |
| 2014/0229096 A1 | 8/2014 | Carlson et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272584 A1 | 9/2014 | Jiang et al. |
| 2016/0111721 A1 | 4/2016 | Xiao et al. |

* cited by examiner

PROCESS FOR LITHIATING NEGATIVE ELECTRODES FOR LITHIUM ION ELECTROCHEMICAL CELLS

CROSS-REFERENCE TO RELATED APPLICATIONS

This application claims the benefit of U.S. Provisional Application No. 62/095,184 filed on Dec. 22, 2014. The entire disclosure of the application referenced above is incorporated herein by reference.

FIELD

The present disclosure relates to processes for lithiating negative anodes for incorporation into lithium-ion electrochemical cells (e.g., batteries).

BACKGROUND

This section provides background information related to the present disclosure which is not necessarily prior art.

High-energy density, electrochemical cells, such as lithium ion batteries can be used in a variety of consumer products including personal electronics, power tools, lawn and garden equipment, motorized wheelchairs, toys, and for transportation. An exemplary use in transportation includes vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often a stack of lithium ion battery cells is electrically connected to increase overall output. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling, the anode function may be associated with the positive electrode rather than the negative electrode (e.g., the negative electrode may be an anode on discharge and a cathode on charge).

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium ion battery. By way of non-limiting example, cathode materials for lithium batteries typically comprise an electroactive material which can be intercalated with lithium ions, such as lithium-transition metal oxides or mixed oxides of the spinel type, for example spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. The negative electrode typically includes a lithium insertion material or an alloy host material.

Typical electroactive materials for forming an anode include lithium-graphite intercalation compounds, lithium-silicon intercalation compounds, lithium-tin intercalation compounds, and lithium alloys.

Many conventional Li-ion batteries can suffer from capacity fade attributable to many factors, including the formation of passive film known as solid electrolyte interphase (SEI) layer over the surface of the negative electrode (anode), which is often generated by reaction products of anode material, electrolyte reduction, and/or lithium ion reduction. Active material ($Li^+$) in the positive electrode can thus form a stable film on surfaces of the electrodes. During the formation and initiation period, active lithium is lost as it passivates the negative electrode. This irreversible reaction, observed in the initial charging cycle, leads to the formation of a stable passive film on the anode. Hence, a portion of an initial amount of lithium present in a battery cell is incorporated into the formation of the SEI resulting in a high irreversible capacity loss (IRCL). The SEI layer formation plays a significant role in determining electrode behavior and properties including cycle life, irreversible capacity loss, high current efficiency, and high rate capabilities, particularly advantageous for power battery and start-stop battery use. Typically, 10-20% of the lithium present in the battery is irreversibly lost during this initial cycle.

To compensate for initial loss of lithium (e.g., in the SEI), extra lithium capacity may be incorporated onto the positive electrode of the battery. However, this approach reduces the energy density of the battery and potentially leads to undesirable lithium plating on the negative electrode. It would be desirable to develop methods of forming high power lithium ion batteries with materials that counteract initial loss of lithium capacity to minimize capacity fade and maximize charge capacity for long-term use.

SUMMARY

This section provides a general summary of the disclosure and is not a comprehensive disclosure of its full scope or all of its features.

The present disclosure provides methods of making a pre-lithiated electrode, such as a negative electrode, for a lithium-ion electrochemical cell (e.g., a battery). In certain aspects, the method comprises disposing a lithium metal source comprising a layer of lithium metal adjacent to a surface of a pre-fabricated negative electrode. Then, heating and compressing of the lithium metal source and the pre-fabricated negative electrode together occurs at a temperature of greater than or equal to about 100° C., which transfers a quantity of lithium to the pre-fabricated negative electrode. Next, the lithium metal source is separated from the surface of the pre-fabricated negative electrode to form the pre-lithiated negative electrode.

In another aspect, the present disclosure provides a continuous method of making a pre-lithiated negative electrode for a lithium-ion electrochemical cell. The method comprises conveying a first sheet comprising a pre-fabricated negative electrode material and a second sheet comprising a lithium metal layer and a carrier substrate layer together into a calendaring system. The lithium metal layer contacts a surface of the pre-fabricated negative electrode in the calendaring system. Then, heat and pressure are applied to the first sheet and the second sheet to transfer lithium to the pre-fabricated negative electrode to form a pre-lithiated negative electrode material. Then, the second sheet is separated from the pre-lithiated negative electrode material.

In yet another aspect, a method of making a lithium-ion electrochemical cell is provided. The method comprises disposing a lithium metal source comprising a layer of lithium metal adjacent to a surface of a pre-fabricated negative electrode. The method further includes heating and compressing the lithium metal source and the pre-fabricated negative electrode together at a temperature of greater than or equal to about 100° C. to transfer a quantity of lithium to the pre-fabricated negative electrode. The lithium metal source is separated from the surface of the pre-fabricated negative electrode to form the pre-lithiated negative electrode. Then, a lithium-ion electrochemical cell is assembled with the pre-lithiated negative electrode and a negative current collector, a positive electrode and positive current collector, a separator, and an electrolyte. The lithium-ion electrochemical cell has an initial capacity of greater than or equal to about 16.5 Amp-hours to less than or equal to about 18 Amp-hours prior to a first charge and discharge cycle, where a quantity of lithium metal transferred to the pre-lithiated negative electrode is greater than or equal to about 1.5 Amp-hours to less than or equal to about 3 Amp-hours.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
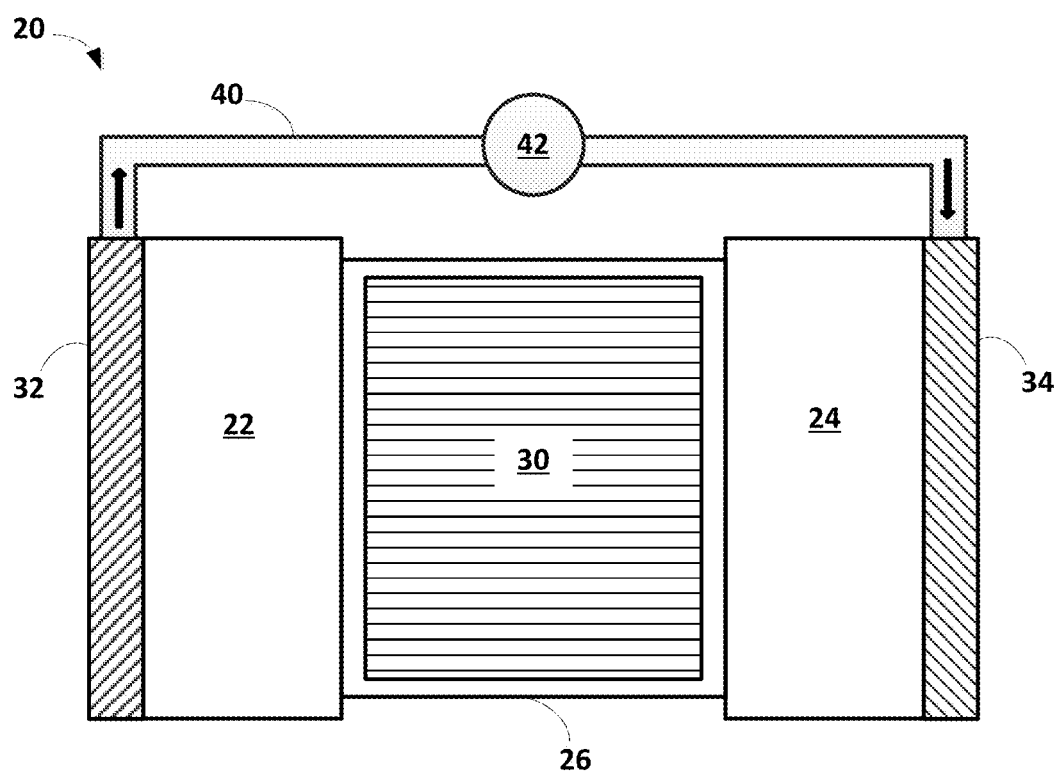
FIG. 1 is a schematic of an exemplary electrochemical battery for purposes of illustration.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

As used herein, the terms "composition" and "material" are used interchangeably to refer broadly to a substance containing at least the preferred chemical compound, but which may also comprise additional substances or compounds, including impurities.

The present technology pertains to improved electrochemical cells, especially lithium ion batteries, which may be used in vehicle applications. In certain aspects, the present disclosure provides processes for lithiating battery electrodes, such as negative electrodes. Such processes may include pre-lithiating the electrode by incorporating active lithium, which may be conducted by placing a preformed electrode (e.g., a negative electrode) in direct contact with a source of lithium metal and heating the preformed electrode and the source of lithium metal. The active lithium added to the electrode prior to electrochemical cell assembly enables replacement of irreversibly lost lithium during cell formation and cell aging, ultimately leading to increased battery capacity and improved battery life.

By way of background, an exemplary and schematic illustration of a lithium ion battery 20 is shown in FIG. 1. Example embodiments will now be described more fully with reference to the accompanying drawings. An exemplary and schematic illustration of a lithium ion battery 20 is shown in FIG. 1. Lithium ion battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20.

The lithium ion battery 20 can generate an electric current during discharge by way of reversible electrochemical reactions that occur when the external circuit 40 is closed (to connect the negative electrode 22 and the positive electrode 34) and the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode 22, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated lithium in the negative electrode 22 is depleted and the capacity of the lithium ion battery 20 is diminished.

The lithium ion battery 20 can be charged or re-powered at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator. In many lithium ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium ion battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium ion battery 20 may vary depending on the particular application for which it is designed. Battery-powered vehicles and hand-held consumer electronic devices, for example, are two examples where the lithium ion battery 20 would most likely be designed to different size, capacity, and power-output specifications. The lithium ion battery 20 may also be connected in series or parallel with other similar lithium ion cells or batteries to produce a greater voltage output and power density if it is required by the load device 42.

Accordingly, the lithium ion battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium ion battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may include, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or a wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

The positive electrode 24 may be formed from any lithium-based active material that can sufficiently undergo lithium intercalation and deintercalation, while functioning as the positive terminal of the lithium ion battery 20. The positive electrode 24 may include a polymeric binder material to structurally fortify the lithium-based active material. The positive electrode 24 may also include electrically conductive materials or particles, such as carbon black or graphite, which can be added to improve electron transport.

One exemplary common class of known active materials that can be used to form the positive electrode 24 is layered lithium transitional metal oxides. For example, the positive electrode 24 may comprise at least one spinel, like lithium manganese oxide ($Li_{(1+x)}Mn_{(2-x)}O_4$), where $0 \leq x \leq 1$, where x is typically less than 0.15, including $LiMn_2O_4$, lithium manganese nickel oxide, ($LiMn_{(2-x)}Ni_xO_4$), where $0 \leq x \leq 1$ and, e.g., $LiMn_{1.5}Ni_{0.5}O_4$, lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, a lithium nickel cobalt metal oxide $LiNi_{(1-x-y)}Co_xM_yO_2$ (wherein $0<x<1$, $y<1$, and M may be Al, Mn, or the like), lithium-transition metal oxides or mixed oxides lithium iron phosphates, or a lithium iron polyanion oxide such as lithium metal phosphates (e.g., $LiFePO_4$) or lithium metal fluorophosphates (e.g., $Li_2FePO_4F$). A variety of other known lithium-based active materials may also be used. By way of non-limiting example, alternative materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide, ($LiMn_{(2-x)}Ni_xO_4$), where $0 \leq x \leq 1$, lithium manganese nickel cobalt oxide, (e.g., $LiMn_{1/3}Ni_{1/3}Co_{1/3}O_2$), or lithium iron phosphate ($LiFePO_6$). Such active materials may be intermingled with at least one polymeric binder, for example, by slurry casting the electroactive materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium ion battery. The negative electrode 22 may also include another electrically conductive material, as well as one or more polymeric binder materials to structurally hold the lithium host material together. For example, in certain embodiments, the negative electrode 22 may comprise graphite, lithium titanate oxide $Li_4Ti_5O_{12}$ (LTO), silicon, silicon-containing alloys, tin-containing alloys, and combinations thereof.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Any of these negative electroactive materials may of course be combined with other electroactive materials.

In one variation, the negative electrode 22 may be formed from lithium titanate oxide (LTO) particles intermingled in at least one of polyvinylidene fluoride (PVDF), a nitrile butadiene rubber (NBR), styrene-butadiene rubber (SBR) binder, or carboxymethoxyl cellulose (CMC) as will be discussed in greater detail below, by way of non-limiting example. The negative electrode current collector 32 may be formed from copper or any other appropriate electrically conductive material known to those of skill in the art.

In certain aspects of the present disclosure, the negative electrode 22 comprises an electroactive material modified in accordance with certain principles of the present teachings. Notably, in alternative variations, the electroactive material used for the positive electrode 24 may also be modified in accordance with certain principles of the present teachings.

Negative electrodes may comprise greater than or equal to about 50% to less than or equal to about 90% of an electroactive material (e.g., graphite particles), optionally greater than or equal to about 5% to less than or equal to about 30% of an electrically conductive material, and a balance binder. Suitable electroactive materials include those discussed previously above and may be the same as the electrically conductive materials, such as graphite. Electrically conductive materials also include carbon black, powdered nickel, metal particles, conductive polymers, or any combinations thereof. Useful binders may comprise a polymeric material and extractable plasticizer suitable for forming a bound porous composite, such as halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

An electrode may be made by mixing the electrode active material, such as graphite powder or particles, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove the remaining plasticizer prior to incorporation into the battery cell.

In certain preferred variations, pre-fabricated electrodes formed of electroactive material via the active material slurry casting described above can be treated in a prelithiation process. Thus, one or more exposed regions of the pre-fabricated negative electrodes comprising the electroactive material can be treated in accordance with certain principles of the present disclosure so that lithium is transferred to the negative electrode, for example, onto and in the surface of the negative electrode materials (like graphite) of the prefabricated electrode that may then be incorporated into the electrochemical cell.

A battery may thus be assembled in a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

For example, in certain variations, an electrode membrane, such as an anode membrane, comprises the electrode active material (e.g., graphite) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

The present disclosure thus contemplates a method of making an electrode (e.g., a negative electrode) for an electrochemical lithium ion battery in certain variations. Such a method may include pre-lithiating an electrode. In certain aspects, the method includes disposing a lithium metal source adjacent to a surface of a pre-fabricated/preformed negative electrode. The pre-fabricated electrode comprises an electroactive material. The lithium metal source may be a layer, sheet, or film comprising lithium metal, such as a lithium foil. In certain aspects, the lithium ion source may be a layer, sheet, or film (e.g., a foil) of lithium metal disposed on a carrier substrate. In certain variations, the lithium metal may be applied to the carrier/substrate via a deposition process, such as physical vapor deposition or chemical vapor deposition processes. The carrier substrate on which the layer of lithium metal is disposed may be selected from the group consisting of: fluoropolymers (e.g., polytetrafluoroethylene), copper foil, or nickel foil, by way of non-limiting example.

A thickness of the lithium metal layer in the lithium metal source may be greater than or equal to about 20 nm to less than or equal to about 100 µm, optionally greater than or equal to about 30 nm to less than or equal to about 50 µm, and in certain variations, optionally greater than or equal to about 1 μm to less than or equal to about 10 μm. In certain aspects, a minimum of 0.06 mg of $Li/cm^2$ is transferred during prelithiation to the negative anode to compensate for the irreversible lithium loss in battery formation (e.g., during the first cycle). In certain variations, to achieve transfer for an amount of lithium of greater than or equal to about 0.06 mg of $Li/cm^2$, a lithium metal film has a thickness of greater than or equal to about 1 μm.

Heat is then applied to the lithium metal source and the pre-fabricated negative electrode. The lithium metal source and the pre-fabricated negative electrode may be further compressed together, under applied pressure. The heating, and optional applied pressure, facilitates transfer of lithium ions onto the surface of the pre-fabricated electrode. The lithium ion transfer is thermodynamically favored, especially where the pre-fabricated anode comprises graphite. In this manner, lithium transfers to the electrode and due to favorable thermodynamics is incorporated into the active material.

With the principles of the present disclosure, a quantity of lithium transferred to the electrode can be controlled by adjusting the time (duration of contact between the lithium metal source adjacent and the surface of a pre-fabricated negative electrode), pressure applied, and temperature during the heating step. In certain aspects, the heating and optional applying of pressure can be conducted for a batch process at a duration of greater than or equal to about 15 minutes, optionally greater than or equal to about 20 minutes, optionally greater than or equal to about 25 minutes, and in certain variations, optionally greater than or equal to about 30 minutes. In certain aspects, the heating and optional applying of pressure can be conducted for a duration of greater than or equal to about 15 minutes to less than or equal to about 60 minutes, optionally greater than or equal to about 20 minutes to less than or equal to about 45 minutes. In certain other aspects, the heating and optional applying of pressure can be conducted for a continuous process at a duration of greater than or equal to about 1 minute, optionally greater than or equal to about 5 minutes, and in certain variations, optionally greater than or equal to about 10 minutes. Thus, in a continuous process, the heating and optional applying of pressure can be conducted for greater than or equal to about 1 minute to less than or equal to about 10 minutes.

Additionally, the proclivity of the lithium metal to be oxidized is reduced, because the source of lithium ions and optional carrier substrate is pressed directly against the electrode surface. After a desired amount of lithium has been transferred to the negative electrode during transfer due to the heating and optional applied pressure for an appropriate duration, the source of lithium metal/ions is removed and separated from the surface of the pre-fabricated negative electrode. In certain aspects, a quantity of lithium transferred per electrode area is greater than or equal to about 0.01 $mg/cm^2$ to less than or equal to about 1 $mg/cm^2$ and optionally 0.05 $mg/cm^2$ to less than or equal to about 0.5 $mg/cm^2$. In certain variations, for example, in a battery sized for an electric vehicle, about 0.06 mg $Li/cm^2$ of negative electrode is transferred during the prelithiation process.

The separation and removal of the lithium metal source permits good control over the amount transferred, but also avoids any physical issues that may arise from the presence of a residual layer, such as small pieces fracturing and forming a physical barrier to the pores of the pre-fabricated electrode. In certain variations, where the carrier substrate film is present in the lithium metal source, the carrier substrate film should be removed to enable assembly of the remaining components within the battery. To reduce air oxidation of the lithium metal, the time between the carrier substrate film removal and cell assembly is desirably minimized.

It should be noted that in certain embodiments, two distinct lithium ion sources may be used during the process and disposed adjacent to a first side of the pre-fabricated negative electrode and a second opposite side of the pre-fabricated negative electrode to transfer greater amounts of lithium to the negative electrode at faster rates. Thus, the heating and compression by applying of pressure facilitates transfer of lithium into both the first side and the second opposite side of the negative electrode at rates controlled by the temperature and amount of pressure applied.

Such methods can be conducted in either a batch process or a continuous process. Such a process thus ensures an additional quantity of active lithium is added to the anode prior to cell assembly, so as to provide excess capacity of lithium to offset and replace the irreversibly lost lithium that occurs during cell formation and cell aging, ultimately leading to increased battery capacity and improved battery life. Furthermore, the amount of transfer of lithium ion can be highly controlled by adjusting the time and temperature of the heating process.

While suitable temperatures for the heating step depend on the materials used (e.g., on the specific lithium ion source materials and the pre-fabricated negative electrode materials) as appreciated by those of skill in the art, in certain variations, the heating is conducted at a temperature of greater than or equal to about 100° C. to less than or equal to about 200° C., optionally greater than or equal to about 115° C. to less than or equal to about 185° C., optionally greater than or equal to about 125° C. to less than or equal to about 175° C., and in certain variations, optionally greater than or equal to about 130° C. to less than or equal to about 170° C. The compressing occurs by applying external pressure or force to the lithium metal source and the pre-fabricated negative electrode. In certain variations, the amount of applied pressure may be greater than or equal to about 0.1 MPa (about 15 psig) to less than or equal to about 40 MPa (about 5,800 psig), optionally greater than or equal to about 10 MPa (about 1,450 psig) to less than or equal to about 30 MPa (about 4,350 psig), and in certain variations, about 20 MPa (about 2,900 psig).

Figure 2:
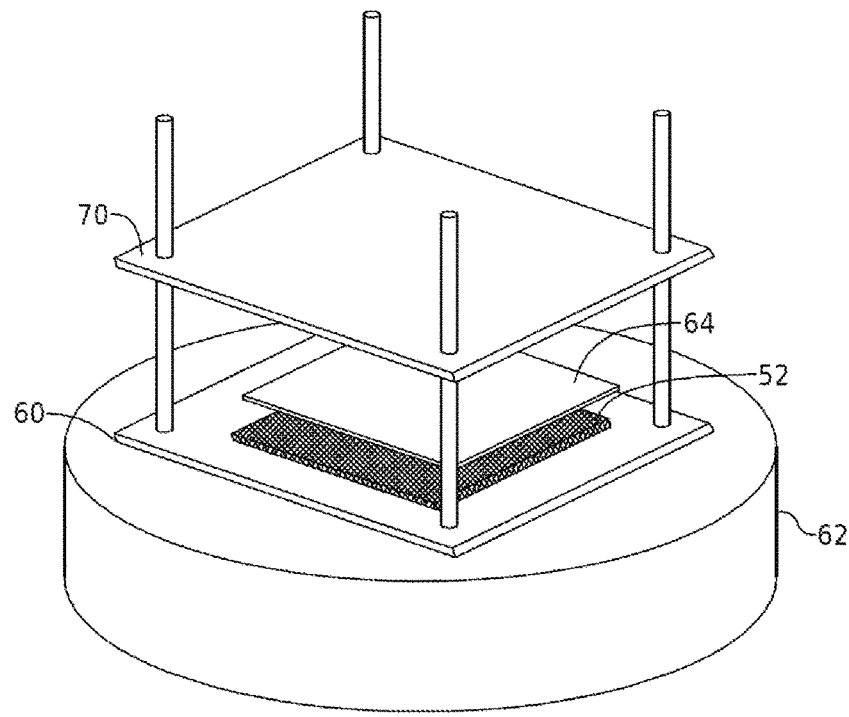
FIG. 2 is a schematic of a processing unit for pre-lithiating a negative electrode in accordance with certain aspects of the present disclosure.

In certain variations, the process may be conducted batch wise, as shown in the processing unit 50 in FIG. 2. First, compressing occurs by disposing a lithium metal source 52 on a first plate 60. The lithium metal source 52 may be an independent lithium foil or may further include a carrier substrate (not shown). First plate 60 is supported on a heat source 62. A pre-fabricated negative electrode 64 is then placed over the lithium metal source 52, so that lithium metal is in contact with at least one surface of the pre-fabricated negative electrode 64. A second plate 70 is disposed over the pre-fabricated negative electrode 64 and force is applied (e.g., via tightening springs to achieve a predetermined tension or force level) to create compression between the plates 60, 70. The heat source 62 then applies heat at a predetermined temperature to the pre-fabricated negative electrode 64 and the lithium metal source 52 to achieve transfer of lithium into the pre-fabricated negative electrode 64. The heat source 62 may then be deactivated for cooling and then the lithium metal source 52 is removed and separated from the pre-fabricated negative electrode 64.

The lithium metal source 52 may be cleaned prior to placement on the first plate 60. However, lithium metal is relatively soft. Thus, during cleaning loose and/or hard abrasives, such as blasting with sand or glass beads, may be avoided. Also, in view of the reactivity of lithium metal, protic solvents (e.g., alcohols, acetone, ethers, and the like) may likewise be avoided when cleaning or treating. A suitable cleaning process may include by way of non-limiting example, wiping the surface with an aprotic solvent, such as hexane, or other cleaning techniques that are gentle and avoid reaction with the lithium, which are recognized in the art.

In certain aspects, the method may further comprise first forming a negative electrode to create the pre-fabricated negative electrode that is pre-lithiated. First, a negative electroactive material (as discussed above, for example, graphite), may be slurry cast with a plurality of electrically conductive particles (e.g., carbon black) and one or more polymeric binders, as discussed above. After processing via such methods, the pre-lithiated negative electrode is thus formed.

In certain aspects, the method further comprises incorporating the pre-lithiated negative electrode formed by such a process into a lithium-ion electrochemical cell (not shown). Thus, a positive electrode, a separator, and an electrolyte, may be assembled with the pre-lithiated negative electrode. In certain aspects, such a lithium-ion electrochemical cell has a rated capacity of about 15 Amp-hours, so desirably a quantity of lithium metal transferred to the pre-lithiated negative electrode during provides an enhanced capacity of greater than or equal to about 1.5 Amp-hours to less than or equal to about 3 Amp-hours (the electrochemical cell has an initial capacity of greater than or equal to about 16.5 Amp-hours to less than or equal to about 18 Amp-hours prior to a first charge and discharge cycle).

Thus, the present disclosure contemplates a lithium ion electrochemical cell that comprises a pre-lithiated negative electrode providing excess active lithium capacity to account for initial lithium loss. The lithium ion electrochemical cell further comprises a positive electrode, a separator, and an electrolyte that comprises a lithium salt. In certain aspects, the lithium ion electrochemical cell is capable of maintaining charge capacity (after the initial charge and discharge cycle) for greater than or equal to at least about 500 hours of operation.

Example 1

Figure 3:
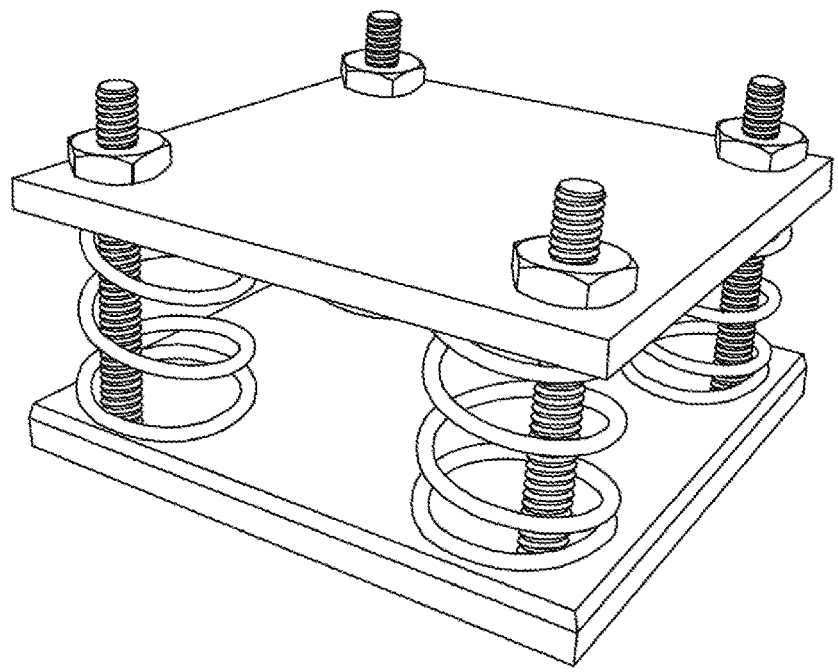
FIG. 3 is a photograph of a processing unit for pre-lithiating a negative electrode in accordance with certain aspects of the present disclosure.

In this example, a pre-lithiated negative electrode is formed by a process using a processing unit like 50 in FIG. 2. A photograph of the lab scale apparatus is shown in FIG. 3 and includes a heat source, a bottom pressure plate, and a top pressure plate. A Li metal or Li metal on a foil (carrier substrate) may be used. First, the lithium foil is cleaned and then laid on the bottom or lower pressure plate. A pre-fabricated anode is disposed within the apparatus over Li metal or Li metal on a foil or other carrier substrate. The top pressure plate is clamped into positioned by tightening springs to a desired tension level. The assembled apparatus is heated for the desired time and temperature (via activation of the heat source). The apparatus is then cooled and dissembled.

Figure 4:
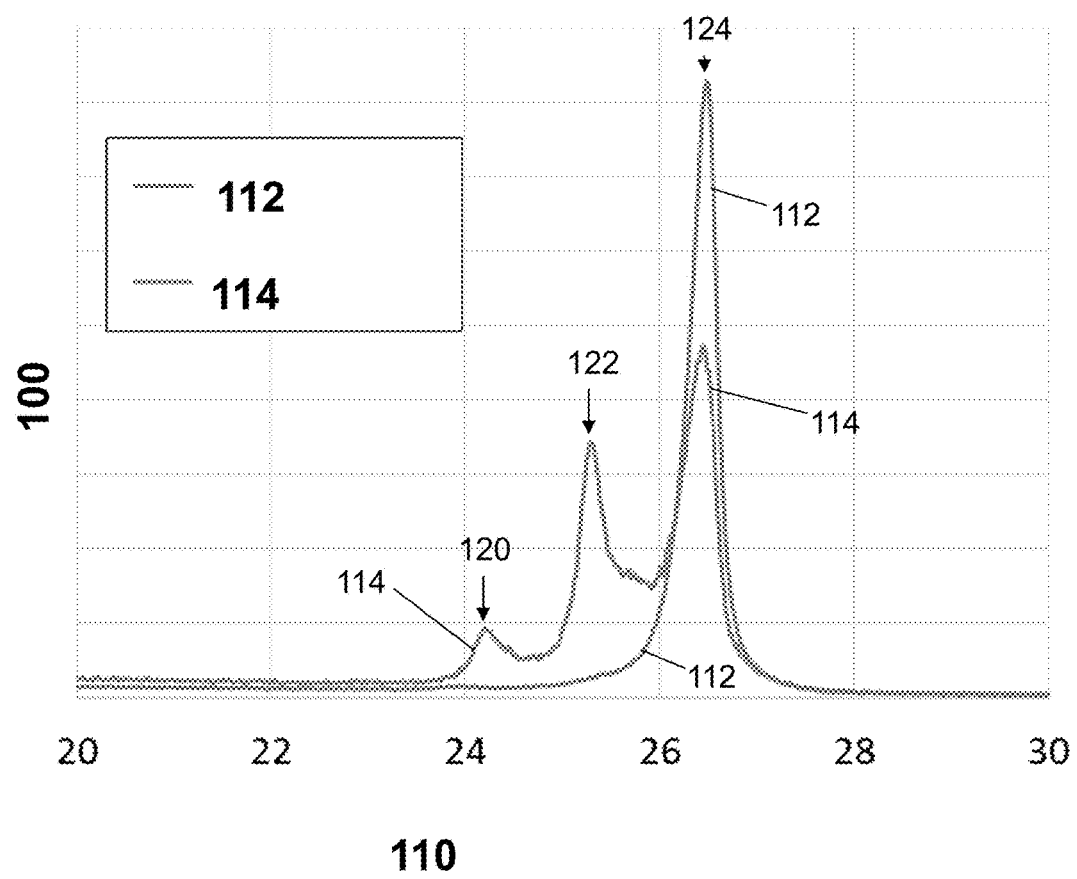
FIG. 4 is an x-ray diffraction graph for a negative electrode material without lithiation and a negative electrode material after lithiation in accordance with certain aspects of the present disclosure.

Lithiation is documented by x-ray diffraction (XRD) analyses shown in FIG. 4. The y-axis 100 represents relative intensity (arbitrary units), while the x-axis 110 represents 2 theta (degrees). The first curve 112 is the negative electrode before any lithiation, while the second curve 114 shows the negative anode after lithiation conducted in accordance with certain aspects of the present disclosure. Peak 120 designates Li-Graphite $Li-C_6$, while peak 122 designates Li-Graphite $Li-C_{12}$, and peak 124 is graphite. Peaks 120 and 122 appear only in the lithiated negative electrode (second curve 114), while the graphite peak 124 is diminished in the second curve 114 as compared to the first curve 112.

A summary of different runs having different test conditions conducted on an apparatus shown in FIG. 3 is set forth in Table 1, including a summary of XRD results.

TABLE 1

| Run | Temp., Set Point (° C.) | Temp., measured (° C.) | Heat Time (min) | Pressure, (relative tension) | Phase Identification | Lithiation |
|---|---|---|---|---|---|---|
| 0 | NA | NA | NA | NA | Graphite | No |
| 1 | 100 | 133 | 10 | Low | Graphite | No |
| 2 | 100 | 133 | 30 | Medium | Graphite, $LiC_6$, & $LiC_{12}$ | Yes |
| 3 | 200 | 180 | 10 | High | Graphite | No |
| 4 | 100 | 133 | 30 | Medium | Graphite, $LiC_6$, & $LiC_{12}$ | Yes |
| 5 | 150 | 156 | 15 | Medium | Graphite, $LiC_6$, & $LiC_{12}$ | Yes |

Figure 5:
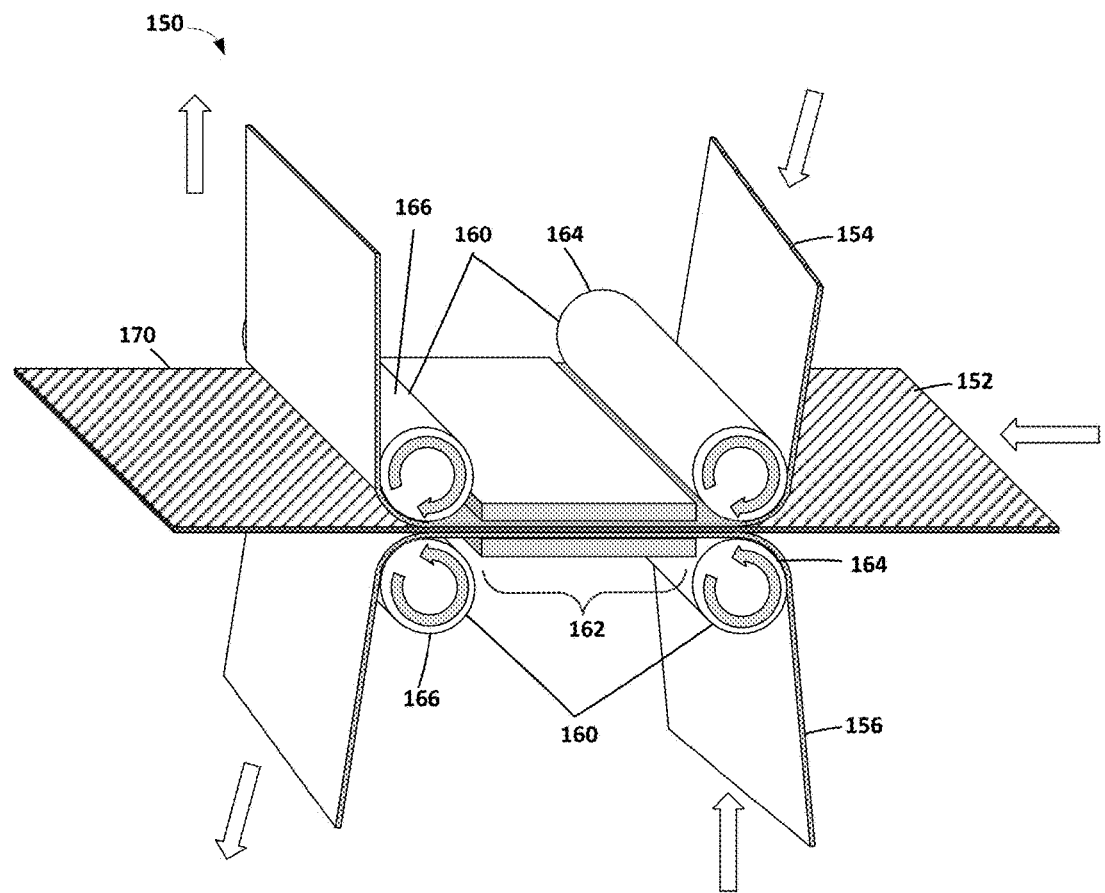
FIG. 5 is a schematic of a calendaring device for conducting a continuous process of pre-lithiating a negative electrode in accordance with certain aspects of the present disclosure.

In yet other aspects, a continuous method of making a pre-lithiated negative electrode for a lithium-ion electrochemical cell is contemplated. Such a method may be conducted with a calendaring processing system 150, as shown in FIG. 5. The method comprises conveying a first sheet 152 comprising a pre-fabricated negative electrode material and a second sheet 154 comprising a lithium metal layer and an optional carrier substrate layer. The calendaring processing system 150 includes a plurality of rollers 160 that cooperate to facilitate continuous introduction and conveyance of the first and second sheets 152, 154 together into a heating zone 162. The arrows show the direction of movement or rotation, including feed directions. As shown, the rollers 160 include a pair of front rollers 164 and a pair of back rollers 166 that cooperate with one another to maintain tension in the sheets being conveyed and processed. As appreciated by those of skill in the art, the number, placement, and size of the rollers may potentially be varied.

The first sheet 152 comprising a pre-fabricated negative electrode material and the second sheet 154 comprising a lithium metal layer lithium metal layer thus establish contact with one another as they enter and pass by the rollers 160 to the heating zone 162. An optional third sheet 156 may also be conveyed into the heating zone 162. The optional third sheet 156 comprises a lithium metal layer and an optional carrier substrate layer, so that both sides of the negative electrode in the first sheet 152 will be lithiated in the heating zone 162. The heating zone 162 includes a first upper plate 170 and a second lower plate 172. The first upper plate 170 and the second lower plate 172 may include one or more heat sources capable of applying heat to the first sheet 152, second sheet 154, and third sheet 154. The first upper plate 170 and the second lower plate 172 may also apply pressure (which may be done continuously or intermittently as the sheets 152, 154, 156 pass by together).

The applying of heat and pressure to the first sheet 152, second sheet 154, and third sheet 154 transfers lithium to the pre-fabricated negative electrode, thus forming a pre-lithiated negative electrode material 170. The temperatures and pressures are the same as those discussed above. After passing by the second pair of rollers 166, the second and optional third sheets 154, 156 are separated from the pre-lithiated negative electrode material 170. While not shown in FIG. 5, the pre-lithiated negative electrode material 170 may be further processed, for example, by sectioning or cutting the pre-lithiated negative electrode material to form a plurality of pre-lithiated electrodes having a size such that they that can be incorporated into a lithium-ion electrochemical cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a pre-lithiated negative electrode for a lithium-ion electrochemical cell, the method comprising:
    disposing a lithium metal source comprising a layer of lithium metal adjacent to a surface of a pre-fabricated negative electrode;
    heating and compressing the lithium metal source and the pre-fabricated negative electrode together to a temperature of greater than or equal to about 115° C. to less than or equal to about 175° C. and applying pressure at greater than or equal to about 10 MPa to less than or equal to about 30 MPa for greater than or equal to about 15 minutes to transfer a quantity of lithium to the pre-fabricated negative electrode, wherein the quantity of lithium transferred per area of the pre-fabricated negative electrode is greater than or equal to about 0.01 mg/cm$^2$ to less than or equal to about 1 mg/cm$^2$; and
    separating the lithium metal source from the surface of the pre-fabricated negative electrode to form the pre-lithiated negative electrode.

2. The method of claim 1, wherein the compressing occurs by first disposing the lithium metal source on a first plate and the pre-fabricated negative electrode on a second plate and applying pressure between the plates.

3. The method of claim 1, wherein the method further comprises incorporating the pre-lithiated negative electrode into an electrochemical cell further comprising a positive electrode, a separator, and an electrolyte, wherein the electrochemical cell has an initial capacity of greater than or equal to about 16.5 Amp-hours to less than or equal to about 18 Amp-hours prior to a first charge and discharge cycle, wherein the quantity of lithium transferred to the pre-lithiated negative electrode is greater than or equal to about 1.5 Amp-hours to less than or equal to about 3 Amp-hours.

4. The method of claim 1, wherein the quantity of lithium transferred per area of the pre-fabricated negative electrode is greater than or equal to about 0.05 mg/cm$^2$ to less than or equal to about 0.5 mg/cm$^2$.

5. The method of claim 1, wherein the lithium metal source further comprises a carrier substrate on which the layer of lithium metal is disposed.

6. The method of claim 5, wherein the carrier substrate is selected from the group consisting of: fluoropolymers, copper foil, and nickel foil.

7. The method of claim 1, wherein the layer of lithium metal comprises a lithium foil.

8. A continuous method of making a pre-lithiated negative electrode for a lithium-ion electrochemical cell, the method comprising:
    conveying a first sheet comprising a pre-fabricated negative electrode material and a second sheet comprising a lithium metal layer and a carrier substrate layer together into a calendaring system, wherein the lithium metal layer contacts a surface of the pre-fabricated negative electrode material in the calendaring system;
    applying heat and pressure to the first sheet and the second sheet to transfer lithium to the pre-fabricated negative electrode material to form a pre-lithiated negative electrode material wherein a temperature is greater than or equal to about 115° C. to less than or equal to about 175° C. and the pressure is greater than or equal to about 10 MPa to less than or equal to about 30 MPa, wherein a quantity of lithium transferred per area of the pre-fabricated negative electrode is greater than or equal to about 0.01 mg/cm$^2$ to less than or equal to about 1 mg/cm$^2$; and
    separating the second sheet from the pre-lithiated negative electrode material.

9. The continuous method of claim 8, further comprising sectioning the pre-lithiated negative electrode material after the separating to form a plurality of pre-lithiated electrodes.

10. The continuous method of claim 8, wherein the method further comprises incorporating the pre-lithiated negative electrode into an electrochemical cell further comprising a positive electrode, a separator, and an electrolyte, wherein the electrochemical cell has an initial capacity of greater than or equal to about 16.5 Amp-hours to less than or equal to about 18 Amp-hours prior to a first charge and discharge cycle, wherein a quantity of lithium transferred to the pre-lithiated negative electrode is greater than or equal to about 1.5 Amp-hours to less than or equal to about 3 Amp-hours.

11. The continuous method of claim 8, wherein a quantity of lithium transferred per unit area of the pre-fabricated negative electrode is greater than or equal to about 0.05 mg/cm$^2$ to less than or equal to about 0.5 mg/cm$^2$.

12. The continuous method of claim 8, wherein the carrier substrate is selected from the group consisting of: fluoropolymers, copper foil, and nickel foil.

13. The continuous method of claim 8, wherein the lithium metal layer comprises a lithium foil.

14. A method of making a lithium-ion electrochemical cell, the method comprising:
    disposing a lithium metal source comprising a layer of lithium metal adjacent to a surface of a pre-fabricated negative electrode;
    heating and compressing the lithium metal source and the pre-fabricated negative electrode together at a temperature of greater than or equal to about 115° C. to less than or equal to about 175° C. and applying pressure at greater than or equal to about 10 MPa to less than or equal to about 30 MPa to transfer a quantity of lithium to the pre-fabricated negative electrode, wherein the quantity of lithium transferred per area of the pre-fabricated negative electrode is greater than or equal to about 0.01 mg/cm$^2$ to less than or equal to about 1 mg/cm$^2$;
    separating the lithium metal source from the surface of the pre-fabricated negative electrode to form a pre-lithiated negative electrode; and
    forming the lithium-ion electrochemical cell by assembling the pre-lithiated negative electrode with a negative current collector, a positive electrode and positive current collector, a separator, and an electrolyte, wherein the lithium-ion electrochemical cell has an initial capacity of greater than or equal to about 16.5 Amp-hours to less than or equal to about 18 Amp-hours prior to a first charge and discharge cycle, wherein the quantity of lithium transferred to the pre-lithiated negative electrode is greater than or equal to about 1.5 Amp-hours to less than or equal to about 3 Amp-hours.

* * * * *